(12) United States Patent
Kakinuma et al.

(10) Patent No.: US 7,958,956 B2
(45) Date of Patent: *Jun. 14, 2011

(54) COAXIAL TWO-WHEEL VEHICLE

(75) Inventors: Takekazu Kakinuma, Tokyo (JP); Ikuo Yamano, Kanagawa (JP); Kunihito Sawai, Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 605 days.

This patent is subject to a terminal disclaimer.

(21) Appl. No.: 11/402,975

(22) Filed: Apr. 13, 2006

(65) Prior Publication Data

US 2006/0260857 A1    Nov. 23, 2006

(30) Foreign Application Priority Data

Apr. 14, 2005   (JP) ............................... P 2005-117365
Apr. 6, 2006   (JP) ............................... P2006-105731

(51) Int. Cl.
  *B60K 1/02*   (2006.01)
  *B62D 11/04*  (2006.01)
  *B62D 61/00*  (2006.01)

(52) U.S. Cl. ...................... 180/65.1; 180/6.5; 180/218

(58) Field of Classification Search .................. 180/65.1, 180/65.5, 180, 181, 218, 6.5, 21, 7.1; 280/652, 280/87.041, 33.992, 32.7, 63
See application file for complete search history.

(56) References Cited

U.S. PATENT DOCUMENTS

| | | | | |
|---|---|---|---|---|
| 1,697,994 A | * | 1/1929 | Moore, Jr. ................. | 280/87.042 |
| 2,726,845 A | * | 12/1955 | Hyslop, Jr. et al. ........... | 254/131 |
| 2,825,575 A | * | 3/1958 | Mickels ................... | 280/87.042 |
| 3,693,987 A | * | 9/1972 | Bobard et al. ................ | 280/755 |
| 3,712,404 A | * | 1/1973 | Walquist ........................ | 180/212 |
| 3,833,215 A | * | 9/1974 | Isdith ............................. | 482/51 |
| 4,020,914 A | * | 5/1977 | Trautwein ..................... | 180/210 |
| 5,630,774 A | * | 5/1997 | Geschwender ................. | 482/57 |

(Continued)

FOREIGN PATENT DOCUMENTS

JP        63-305082        12/1988

(Continued)

OTHER PUBLICATIONS

U.S. Appl. No. 12/533,755, filed Jul. 31, 2009, Kosaka, et al.

*Primary Examiner* — J. Allen Shriver, II
*Assistant Examiner* — Bridget Avery
(74) *Attorney, Agent, or Firm* — Oblon, Spivak, McClelland, Maier & Neustadt, L.L.P.

(57) ABSTRACT

A coaxial two-wheel vehicle on which a rider stably travels without the upper body being swayed left and right in a riding state of the center of gravity being positioned high is provided.

The coaxial two-wheel vehicle includes: a step plate for a driver to ride; a vehicle body that supports the step plate so as to be capable of changing a posture in a roll direction of rotating around a roll axis as the center, when a traveling direction is made the roll axis; a pair of wheels disposed on both sides on the same axis in the direction orthogonal to the traveling direction of the vehicle body and rotatably supported by the vehicle body; a pair of wheel drive means to drive and rotate the pair of wheels independently; and a handle for directly changing a posture of the step plate or indirectly changing the posture through the vehicle body.

14 Claims, 12 Drawing Sheets

U.S. PATENT DOCUMENTS

| | | | |
|---|---|---|---|
| 5,810,371 A * | 9/1998 | Velke | 280/32.7 |
| 5,882,020 A * | 3/1999 | Velke | 280/32.7 |
| 5,947,505 A * | 9/1999 | Martin | 280/493 |
| 6,000,705 A * | 12/1999 | Velke | 280/32.7 |
| 6,062,582 A * | 5/2000 | Martin | 280/493 |
| 6,234,495 B1 * | 5/2001 | Velke | 280/32.7 |
| 6,288,505 B1 | 9/2001 | Heinzmann et al. | 318/139 |
| 6,488,291 B1 * | 12/2002 | Bellis, Jr. | 280/32.7 |
| 6,497,422 B1 * | 12/2002 | Bellis, Jr. | 280/32.7 |
| 6,651,766 B2 * | 11/2003 | Kamen et al. | 180/218 |
| 6,692,010 B1 * | 2/2004 | Johnson et al. | 280/32.7 |
| 7,011,171 B1 * | 3/2006 | Poulter | 180/8.2 |
| 7,178,614 B2 * | 2/2007 | Ishii | 180/7.1 |
| 7,303,032 B2 * | 12/2007 | Kahlert et al. | 180/65.1 |
| 7,803,090 B2 * | 9/2010 | Kraus | 482/62 |

FOREIGN PATENT DOCUMENTS

| | | | | |
|---|---|---|---|---|
| JP | 63305082 | * | 12/1988 | 180/209 |
| JP | 2004074814 | * | 3/2004 | |
| JP | 2005-6435 | | 1/2005 | |
| JP | 2005-006436 | | 1/2005 | |
| JP | 2005001554 | * | 1/2005 | |
| JP | 2006001385 A | * | 1/2006 | |
| JP | 2005039962 | * | 2/2007 | |

* cited by examiner

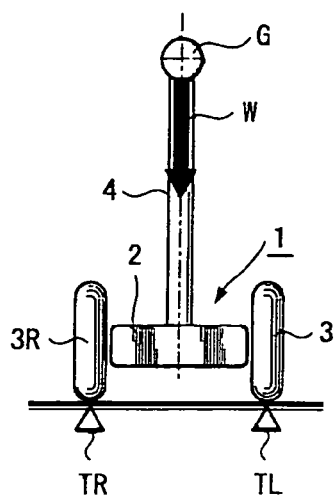
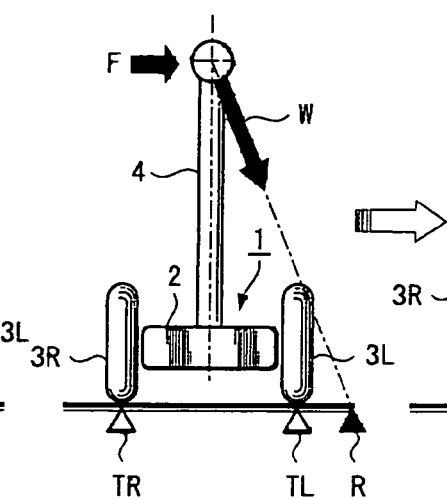
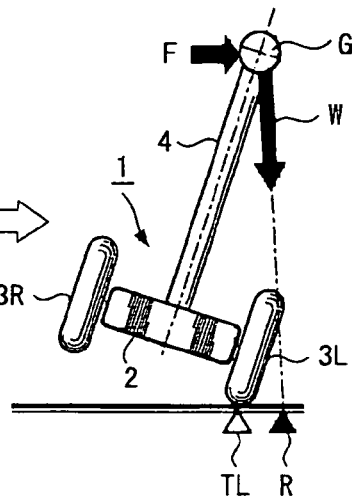
FIG. 1A  FIG. 1B  FIG. 1C
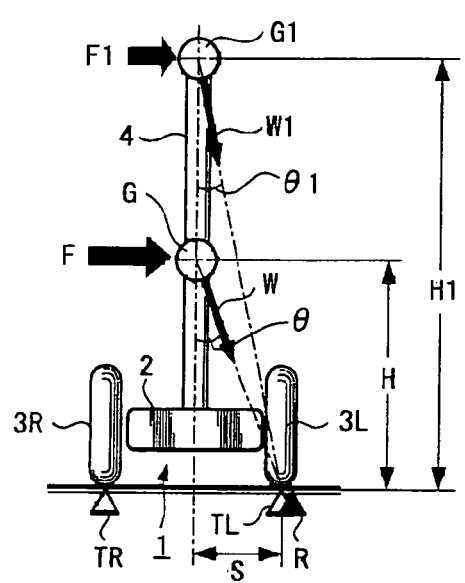
FIG. 2
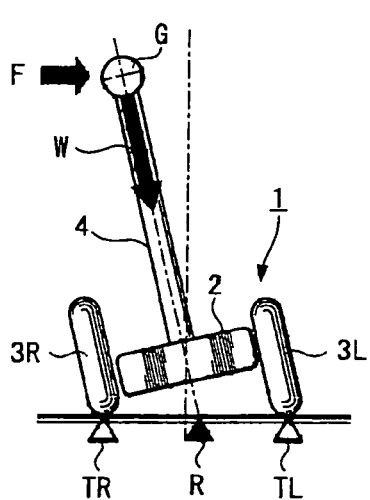
FIG. 3

COAXIAL TWO-WHEEL VEHICLE

CROSS REFERENCES TO RELATED APPLICATIONS

The present invention contains subject matter related to Japanese Patent Application JP 2005-117365, filed in the Japanese Patent Office on Apr. 14, 2005, and Japanese Patent Application JP 2006-105731 filed in the Japanese Patent Office on Apr. 6, 2006, the entire contents of which are incorporated herein by reference.

BACKGROUND OF THE INVENTION

1. Field of the Invention

The present invention relates to a coaxial two-wheel vehicle including two wheels disposed on the same axis center line, and it particularly relates to a coaxial two-wheel vehicle which can travel freely with people riding thereon.

2. Description of the Related Art

As a coaxial two-wheel vehicle of this kind in related art, there is one described in Patent Reference 1, for example. In Patent Reference 1, there is a description relating to a coaxial two-wheel vehicle including wheels at both ends of the same axle. The coaxial two-wheel vehicle described in Patent Reference 1 is "a coaxial two-wheel vehicle configured to have a pair of wheels; a wheel axle provided between the pair of wheels; a base capable of tilting supported above the wheel axle; a pair of drive motors mounted on the base to drive each of the pair of wheels; and a controller that sends an operation command to the pair of drive motors, wherein an acceleration detector for detecting acceleration in the vertical direction is provided in the base, and the controller sends an operation command to decelerate to each of the pair of drive motors when an absolute value of the acceleration detected during travel by the acceleration detector is a predetermined threshold value or more".

According to the coaxial two-wheel vehicle of Patent Reference 1 having the above-described configuration, the vehicle is expected to obtain such effectiveness that "in a case, for example, of running onto a step, since the acceleration detector for detecting acceleration in the vertical direction is included and the operation command to decelerate is sent to each of the pair of drive motors when an absolute value of the acceleration detected during travel by the acceleration detector is a predetermined threshold value or more, safe travel can be performed by following the step and the like."

In addition, as another example of a coaxial two-wheel vehicle in related art, there is one described in Patent Reference 2, for example. In Patent Reference 2, there is a description relating to a method of controlling the posture of a coaxial two-wheel vehicle. The posture control method in the coaxial two-wheel vehicle described in Patent Reference 2 is "in the coaxial two-wheel vehicle configured to have a pair of wheels; a wheel axle provided between the both wheels; a vehicle body supported above the wheel axle in a turnable manner; a wheel drive motor mounted on the vehicle body; a control computer that sends an operation command to the wheel drive motor; and an angle detector for detecting an inclination of the vehicle body, an angle of inclination of the vehicle body detected by the angle detector is sampled at short-time intervals, computation is performed by assigning a sampled value to a control input calculation formula that is input and set in advance in the control computer, where the sampling inclination angle of the vehicle body is used as a state variable and a feed-back gain is used as a coefficient, controlling torque for the wheel drive motor is calculated based on the computation; and a command to perform an operation equivalent to the calculated control torque is sent from the control computer to the wheel drive motor."

According to the posture control method in the coaxial two-wheel vehicle of Patent Reference 2 that has the above-described configuration, it is expected to have such effectiveness that "in case that the vehicle body tilts, immediately the wheel shifts in the direction of the vehicle body inclined and so a restoration of posture of the vehicle body is performed without fail, because the computation is performed by assigning a sampled value to the control input calculation formula that is input and set in advance in the control computer, where the sampling inclination angle of the vehicle body and the feed-back gain are used as the coefficients; controlling torque for the wheel drive motor is calculated based on the computation; and feed-back control of the wheel drive motor is performed based on the result of this calculation".

[Patent Reference 1] Japanese Published Patent Application No. 2005-6436

[Patent Reference 2] Japanese Published Patent Application No. S63-305082

However, in the coaxial two-wheel vehicles described in the above-mentioned Patent References 1 and 2, a handle is fixed to a step plate (riding portion) for a man to ride, a support portion supporting the wheels in a freely rotatable manner is fixed to the step plate, and the upper surface of the step plate (riding surface) is continuously in parallel with a traveling surface (road surface). Accordingly, when the center of gravity is at a high position like a standing posture in which a man is riding in a standing state, an upper body of the rider becomes unstable by being swayed right and left due to an action of gravitational force at the time of traveling on a cant road surface where the road surface inclines in the direction orthogonal to a traveling direction or due to an action of centrifugal force at the time of turning, and there is a possibility that the vehicle body is overturned in the lateral direction when the force becomes considerably large.

Details are explained in this regard by referring to FIGS. 1 through 3. FIGS. 1A through 1C are explanatory diagrams respectively showing a state of the coaxial two-wheel vehicle of related art viewed from the front side of the vehicle. In FIGS. 1A through 1C, reference numeral 1 denotes the whole of a coaxial two-wheel vehicle in which a vehicle body 2 used also as a step plate is provided. Left and right wheels 3L and 3R are rotatably provided on both sides in the direction orthogonal to a traveling direction of the vehicle body 2. In addition, reference numeral 4 denotes a riding object (such as a man, for example) riding on the vehicle body 2, reference symbol G denotes the center of gravity of the rider 4, and reference symbol W denotes a weight (load) of the rider 4.

FIG. 1A shows a state of the coaxial two-wheel vehicle 1 traveling straight on a flat road surface without an influence of lateral force and centrifugal force. In this state, the center of gravity G of the rider 4 is positioned approximately above the center of the coaxial two-wheel vehicle 1 and the load W acts vertically to work at the approximate center of the vehicle body 2. Accordingly, approximately the same load acts on the left and right wheels 3L and 3R, and the reaction force thereof becomes approximately the same at ground contact points TL and TR where the wheels 3L and 3R come into contact with a road surface E.

FIG. 1B shows a state of the coaxial two-wheel vehicle 1 making a turn on the flat road surface E. In this state, centrifugal force (lateral force) F acts on the rider 4 from the right wheel 3R side, and a weight vector W of the load W slants by an angle θ due to the influence of the centrifugal force F.

When a ground contact point R where an extended line of the weight vector W intersects the road surface E is inside the ground contact point TL of the left wheel 3L, the coaxial two-wheel vehicle 1 can make a turn with stability. However, when the ground contact point R is outside the ground contact point TL, as shown in FIG. 1B, the stability of the traveling is impaired, because the left and right wheels 3L and 3R are unable to bear the centrifugal force F, and the vehicle may overturn (falling in the lateral direction), as shown in FIG. 1C, when the centrifugal force F becomes considerably large.

A difficulty level causing this coaxial two-wheel vehicle 1 to overturn greatly depends on the height of the center of gravity G of the rider 4. FIG. 2 is a diagram to explain about that. When the center of gravity G of the rider 4 is at a low position, a tilt angle allowed to the weight vector W of the center of gravity G is an angle $\theta$ as shown in FIG. 2. However, when the center of gravity G of the rider 4 is high and shifts to the center of gravity G1, the tilt angle at the center of gravity G1 becomes an angle $\theta 1$ which is smaller than the angle $\theta$ ($\theta 1 < \theta$), since a distance S from the center of the vehicle body 2 to the ground contact points TL and TR of the left and right wheel 3L and 3R remains unchanged.

From the above, it is understood that the difficulty level of causing the coaxial two-wheel vehicle 1 to overturn is expressed by a product of the height of the center of gravity G and the centrifugal force F. Specifically, assuming that the ground contact point R of the weight vector W corresponds to the ground contact point TL of the left wheel 3L when the centrifugal force F acts on the center of gravity G, $F \times H = S$ (expression 1) can be obtained. Similarly, assuming that the ground contact point R of a weight vector W1 corresponds to the ground contact point TL of the left wheel 3L when a centrifugal force F1 acts on the center of gravity G1, $F1 \times H1 = S$ (expression 2) can be obtained. Accordingly, $F \times H = F1 \times H1$. Here, $F > F1$ because $H < H1$. Therefore, when the center of gravity is positioned higher, the coaxial two-wheel vehicle 1 may overturn, even if the centrifugal force becomes smaller by that much.

Such a overturn of the coaxial two-wheel vehicle 1 can be prevented with a structure shown in FIG. 3. FIG. 3 is a diagram showing the vehicle body 2 being inclined toward the road surface E on the right wheel 3R side where the centrifugal force F acts. When the vehicle body 2 is thus inclined to the side where the centrifugal force F acts, a overturn of the coaxial two-wheel vehicle 1 can be prevented and a stable turning 1 becomes possible, because the ground contact point R of the weight vector W1 shifts to the inside of the ground contact point TL of the left wheel 3L.

SUMMARY OF THE INVENTION

In a coaxial two-wheel vehicle in related art, the upper surface (riding surface) of a step plate is continuously in parallel with a traveling surface (road surface), and so an upper body of a rider becomes unstable by being swayed left and right due to an action of gravitational force at the time of traveling on a cant road surface and due to an action of centrifugal force at the time of turning when the center of gravity is at a high position in a standing posture in which a man is riding in a standing state, and further there is a possibility that the vehicle may overturn when such force becomes considerably large.

A coaxial two-wheel vehicle according to an embodiment of the present invention is configured to have: a step plate for a driver to ride; a vehicle body supporting the step plate so as to be capable of changing a posture in a roll direction of rotating around a roll axis as the center when the traveling direction is set as the roll axis; a pair of wheels disposed on the same axis on both sides in a direction orthogonal to the traveling direction of the vehicle body and rotatably supported by the vehicle body; a pair of wheel drive means to drive and rotate the pair of wheels independently; and a handle for directly changing a posture of the step plate or indirectly changing the posture through the vehicle body.

According to the embodiment of the coaxial two-wheel vehicle of the present invention, the posture of the step plate is changed at the time of making a turn and the like to shift a ground contact point of a weight vector of the center of gravity of a rider or the like to the inside of a ground contact point of the wheel, an overturn of the coaxial two-wheel vehicle is prevented and a stable turning becomes possible.

BRIEF DESCRIPTION OF THE DRAWINGS

FIGS. 1A to 1C are explanatory diagrams to explain a relation between a coaxial two-wheel vehicle and centrifugal force, in which FIG. 1A shows a state of the centrifugal force not acting, FIG. 1B shows a state of the centrifugal force acting, and FIG. 1C shows a state of the vehicle being overturned by the centrifugal force, respectively;

FIG. 2 is an explanatory diagram to explain a relation among a coaxial two-wheel vehicle, centrifugal force, and a height of the center of gravity of a rider;

FIG. 3 is an explanatory diagram showing a countermeasure against centrifugal force that acts on a coaxial two-wheel vehicle;

FIGS. 4A and 4B are diagrams showing a first embodiment of a coaxial two-wheel vehicle according to the present invention, in which FIG. 4A is a front view and FIG. 4B is a lateral view;

FIGS. 12A to 12C are explanatory diagrams to explain a traveling state of the first embodiment of the coaxial two-wheel vehicle according to the present invention, in which FIG. 12A shows a straight travel on a flat road surface, FIG. 12B shows a turning on a flat road surface, and FIG. 12C shows a straight travel on a cant road surface, respectively;

FIGS. 13A and 13B are diagrams showing a second embodiment of a coaxial two-wheel vehicle according to the present invention, in which FIG. 13A is a front view and FIG. 13B is a lateral view;

FIGS. 14A and 14B are explanatory diagrams showing a relevant part of the coaxial two-wheel vehicle shown in FIG. 13A enlarged, in which FIG. 14A is a state of straight travel and FIG. 14B is a state of turning, respectively;

FIGS. 15A and 15B are diagrams showing a third embodiment of a coaxial two-wheel vehicle according to the present invention, in which FIG. 15A is a front view and FIG. 15B is a lateral view; and FIGS. 16A and 16B are explanatory diagrams showing a relevant part of the coaxial two-wheel vehicle shown in FIG. 15A enlarged, wherein FIG. 16A is a state of straight travel and FIG. 16B is a state of turning, respectively.

DESCRIPTION OF THE PREFERRED EMBODIMENTS

A coaxial two-wheel vehicle capable of performing a stable turning without easily causing an overturn is obtained with a simplified structure in which a step plate is inclined to the inside of a turning direction.

Figures 4A, 4B:
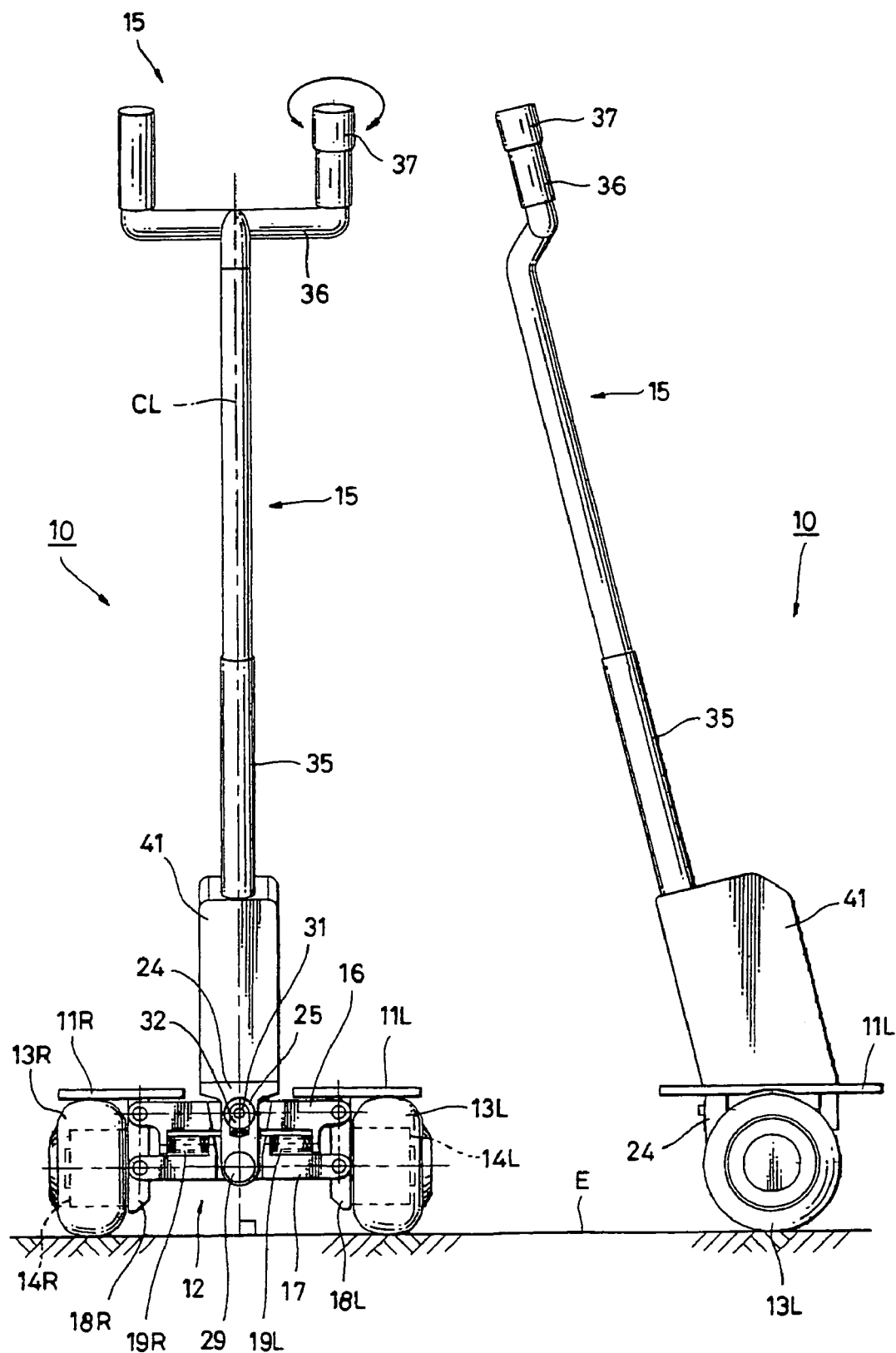
Figure 5:
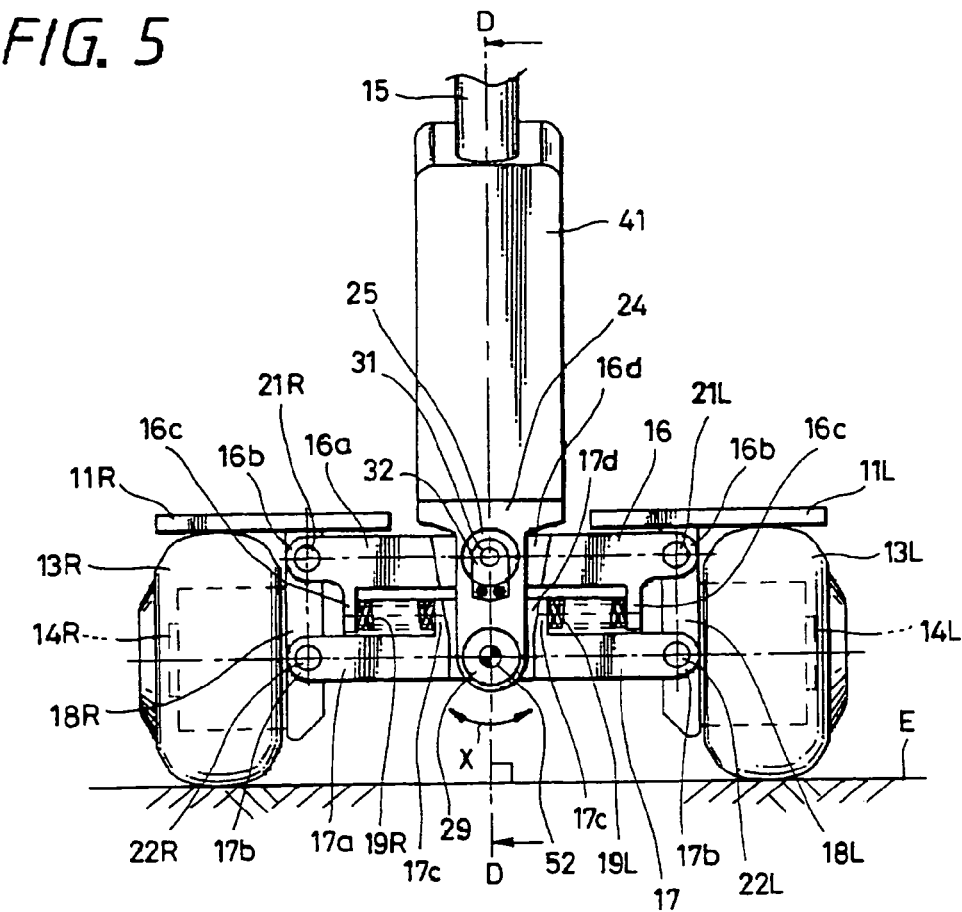
FIG. 5 is an explanatory diagram showing a relevant part of the coaxial two-wheel vehicle shown in FIG. 4A enlarged.
Figure 6:
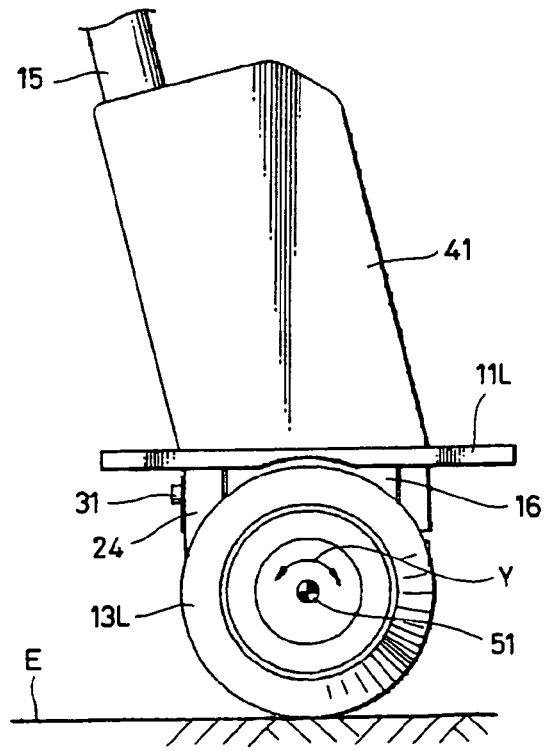
FIG. 6 is an explanatory diagram showing a relevant part of the coaxial two-wheel vehicle shown in FIG. 4B enlarged.
Figure 7:
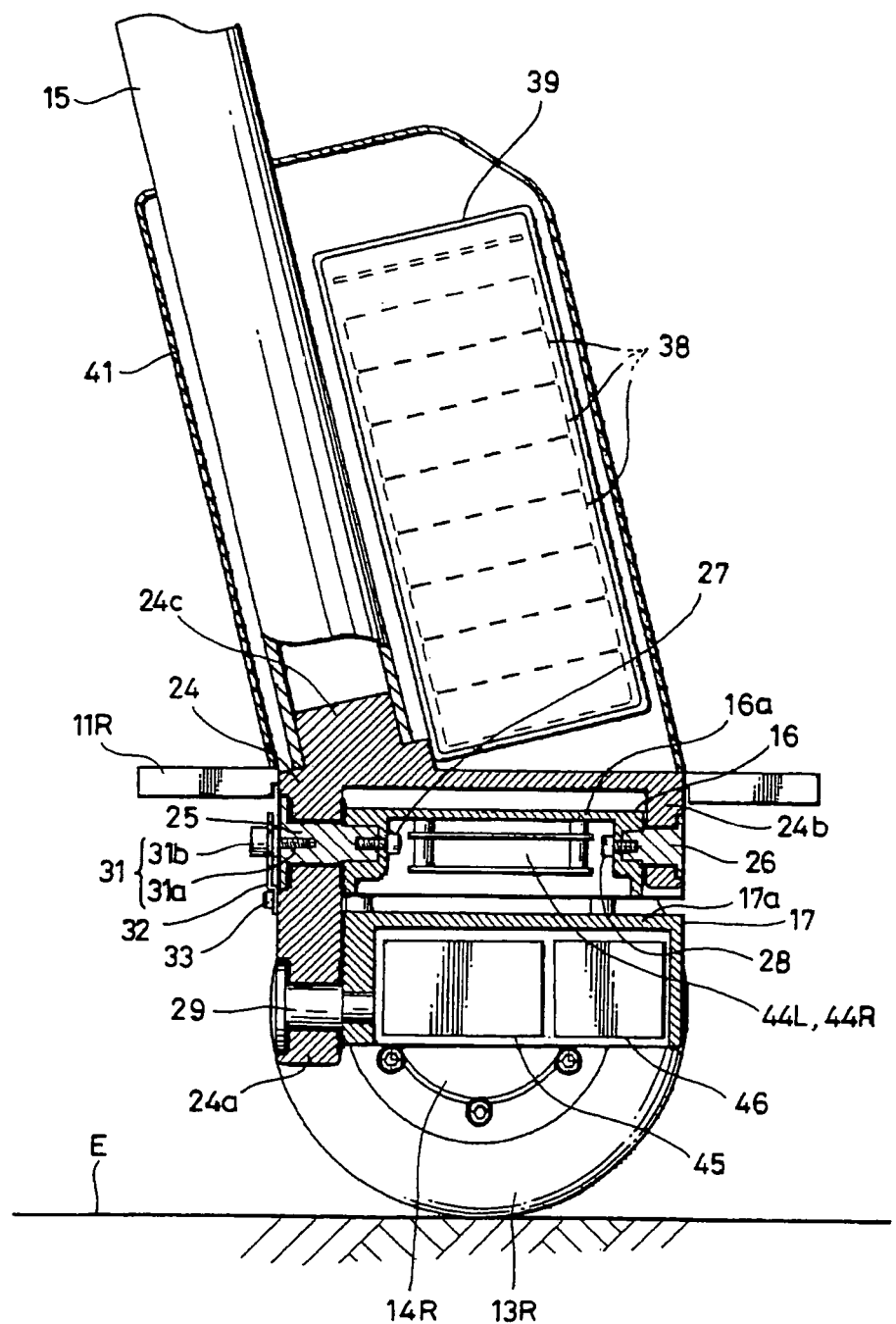
FIG. 7 is an enlarged cross-sectional diagram of a D-D line portion of the coaxial two-wheel vehicle shown in FIG. 5.
Figure 8:
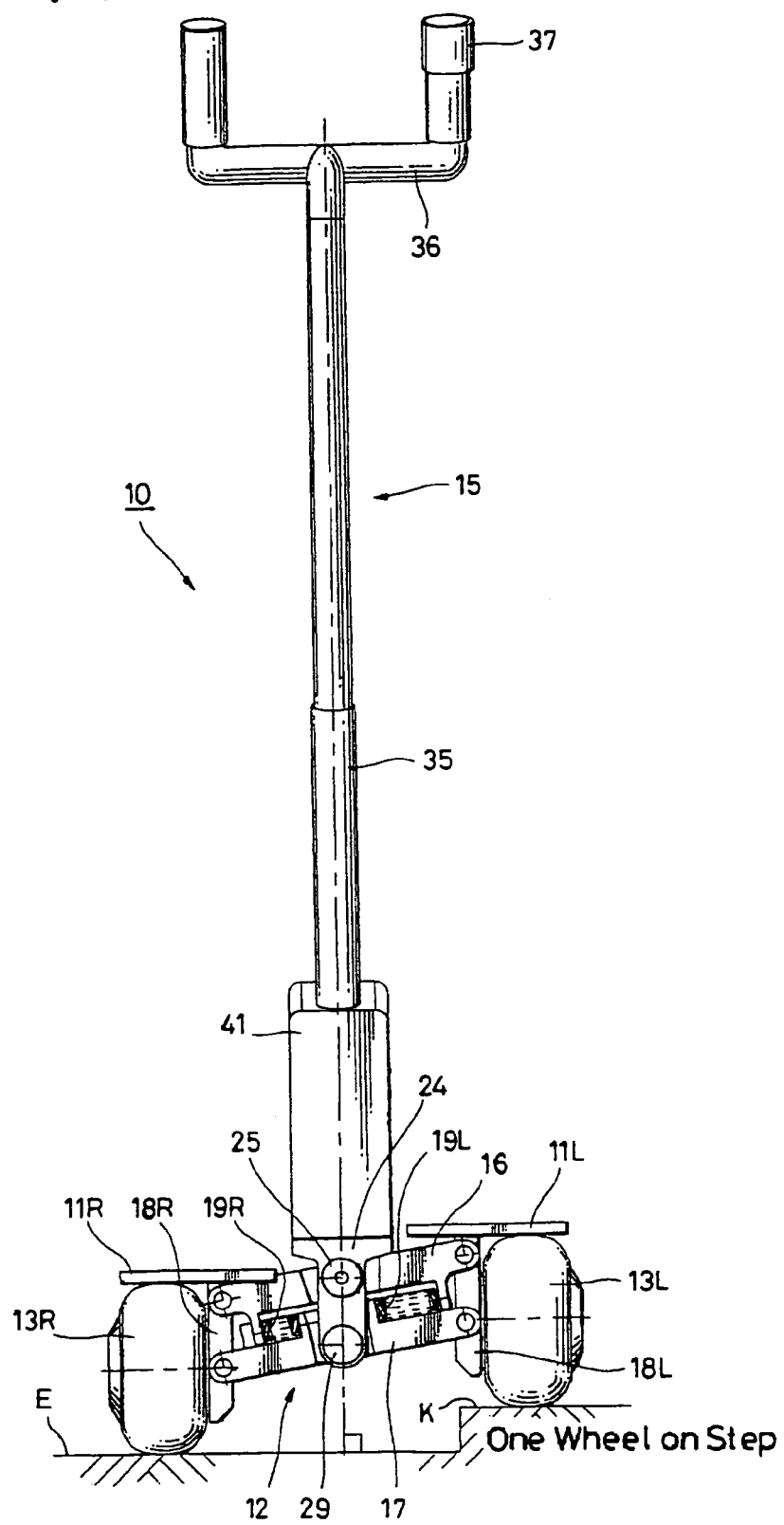
FIG. 8 is an explanatory diagram to explain an operation of the coaxial two-wheel vehicle shown in FIG. 4A, showing a state in which one wheel runs on a step.
Figure 9:
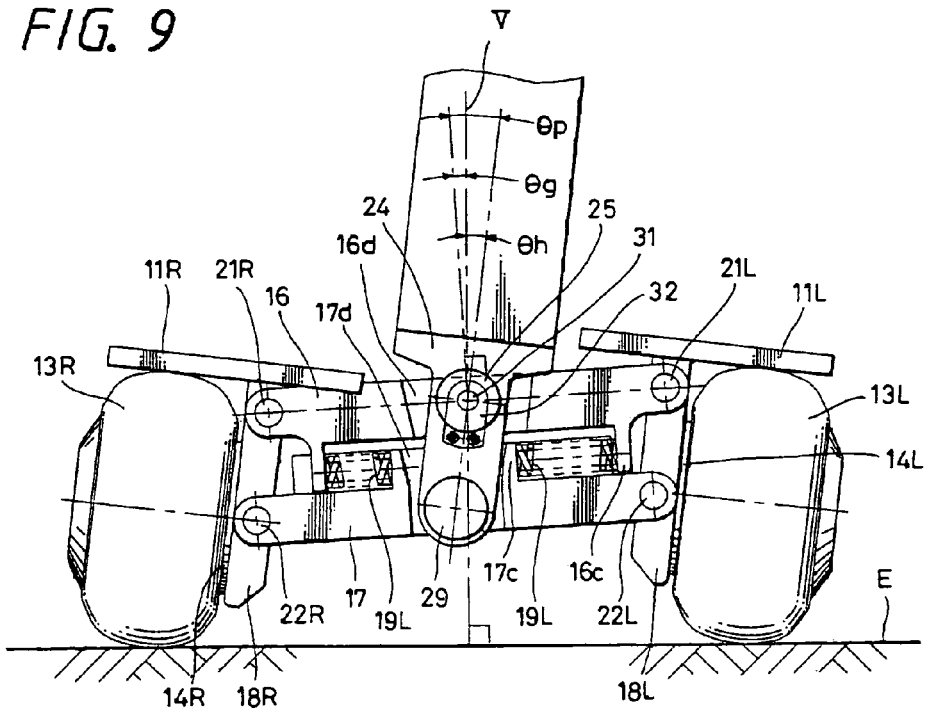
FIG. 9 is an explanatory diagram to explain an operation of the coaxial two-wheel vehicle shown in FIG. 4A, showing a state of turning on a flat road surface.
Figure 10:
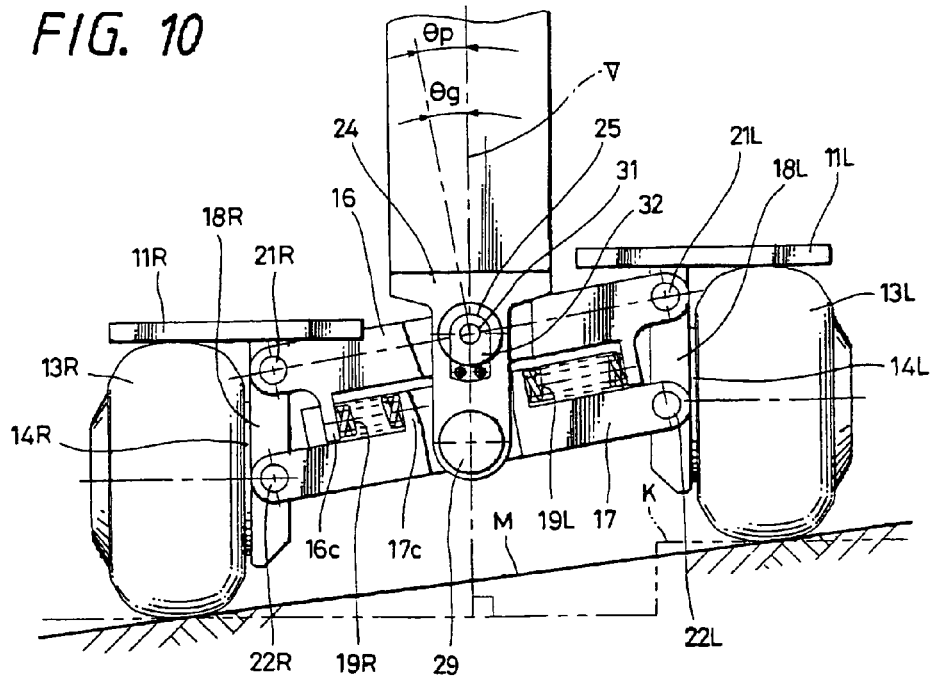
FIG. 10 is an explanatory diagram to explain an operation of the coaxial two-wheel vehicle shown in FIG. 4A, showing a state of straight travel on a cant road surface.
Figure 11:
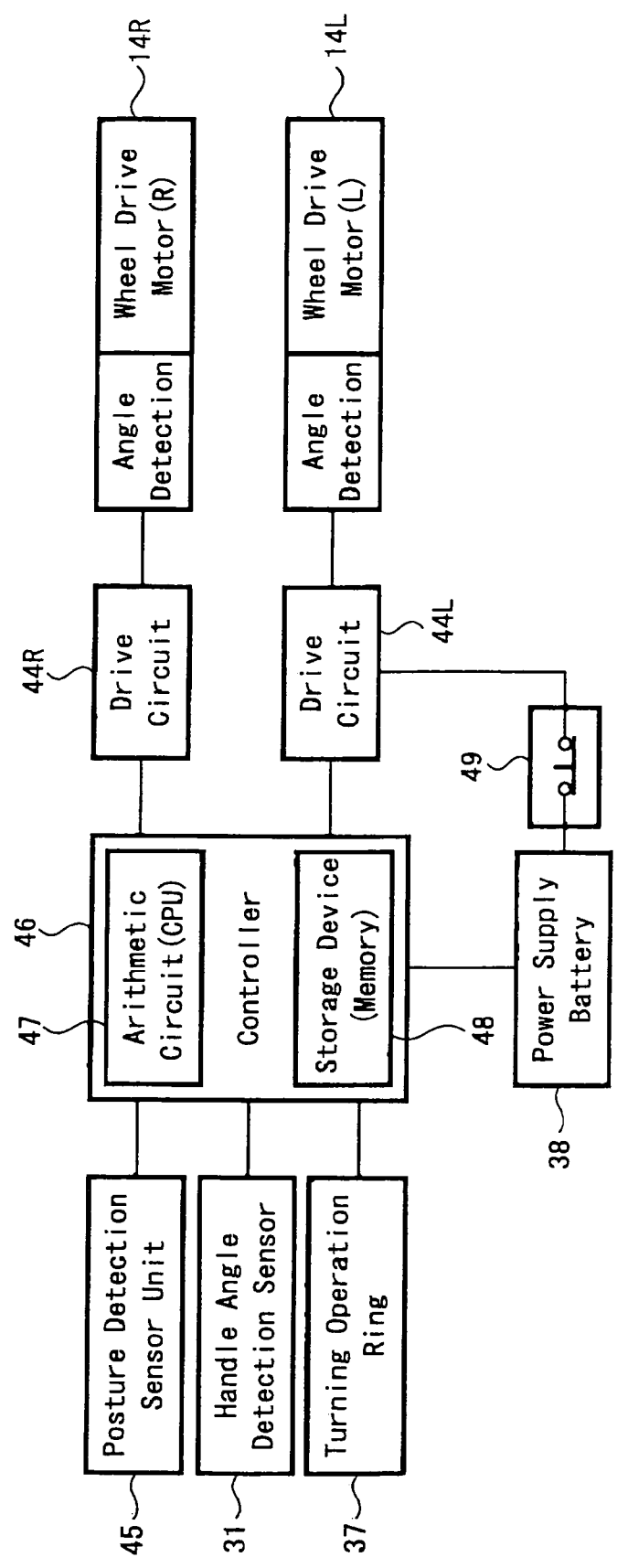
FIG. 11 is a block diagram schematically showing a configuration of a controller according to the first embodiment of the coaxial two-wheel vehicle of the present invention.
Figure 12A:
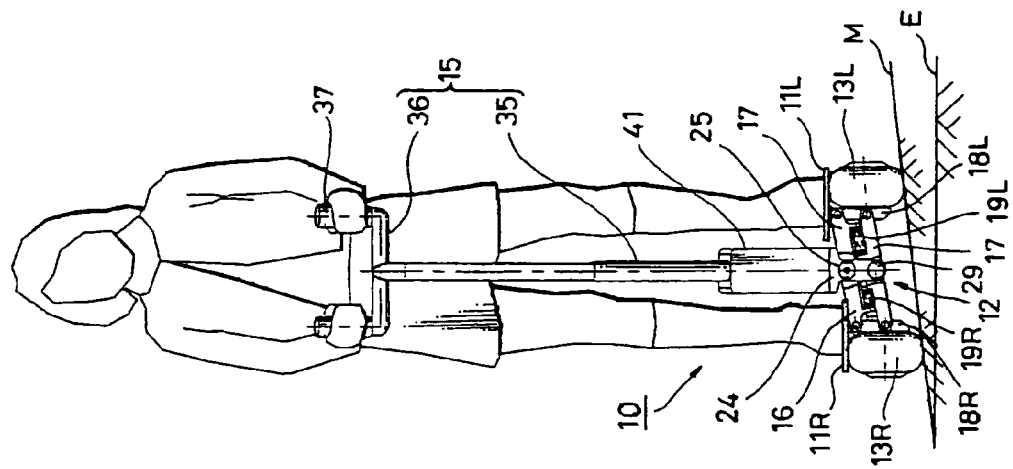
Figure 12B:
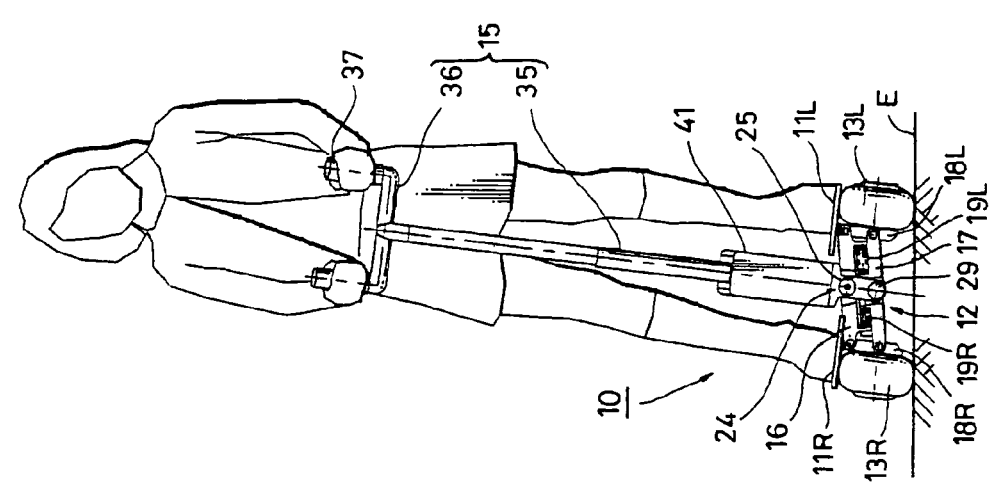
Figure 12C:
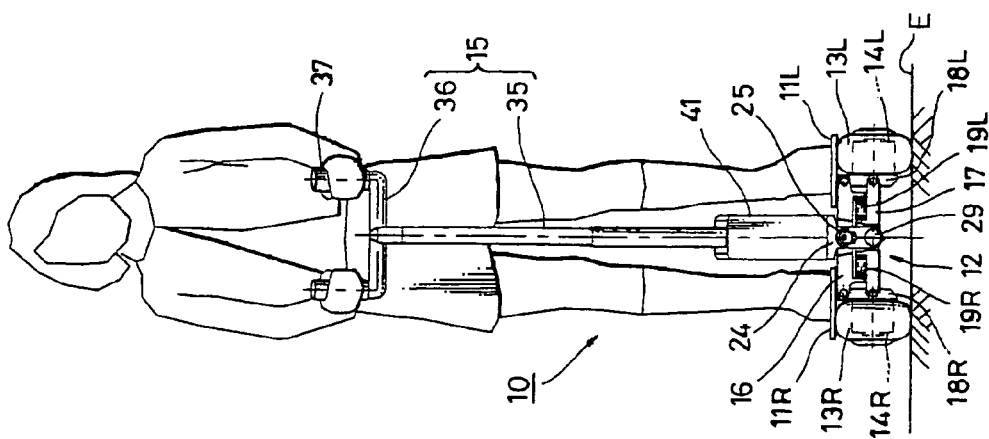
Figures 13A, 13B:
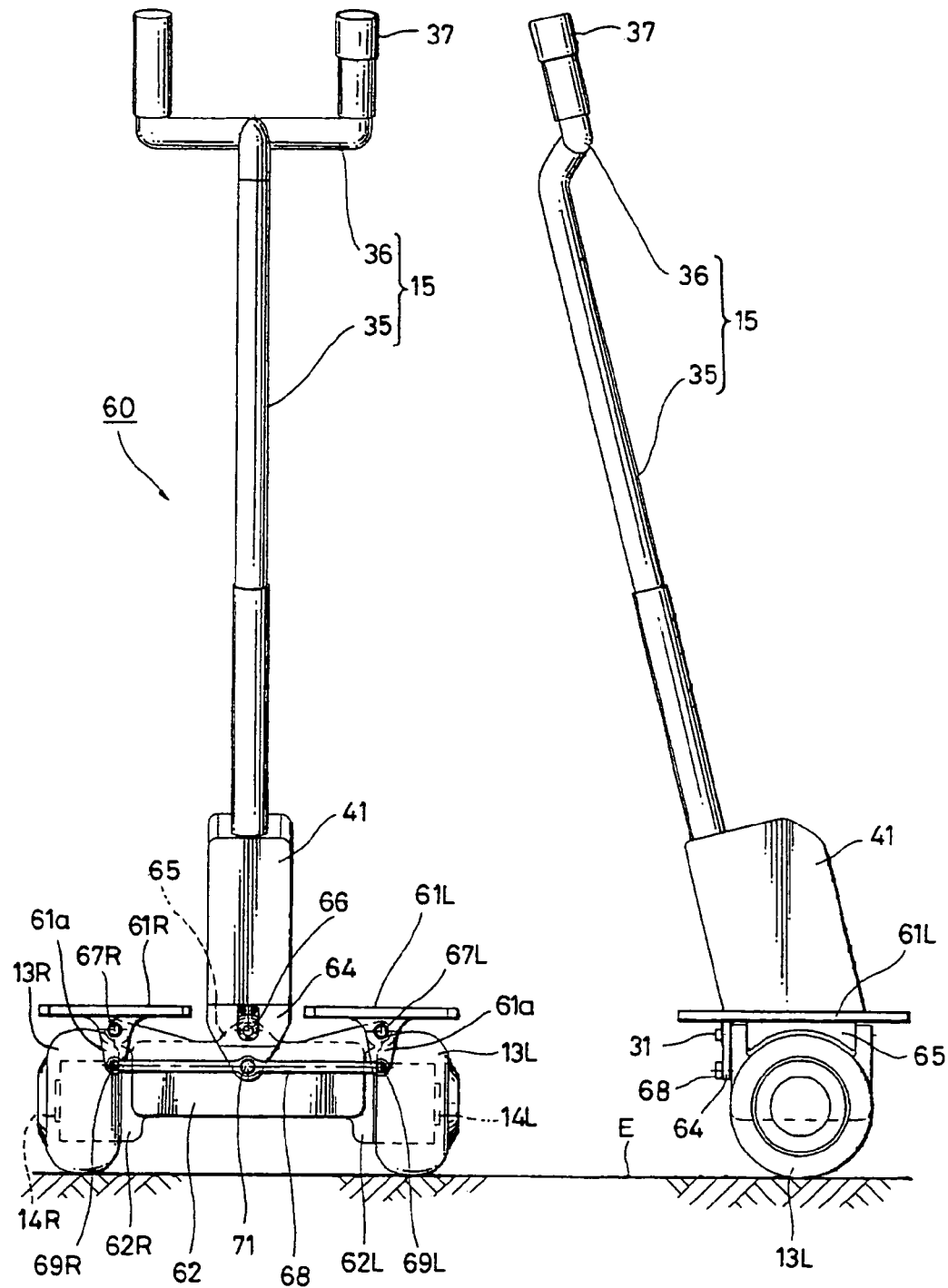
Figure 14A:
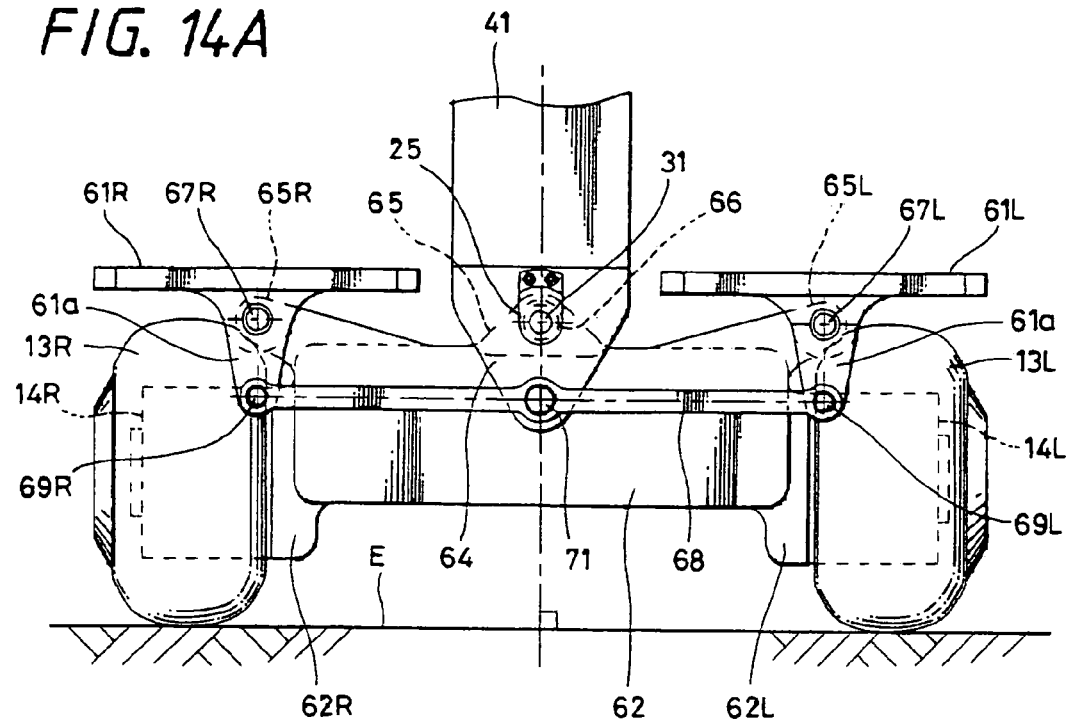
Figure 14B:
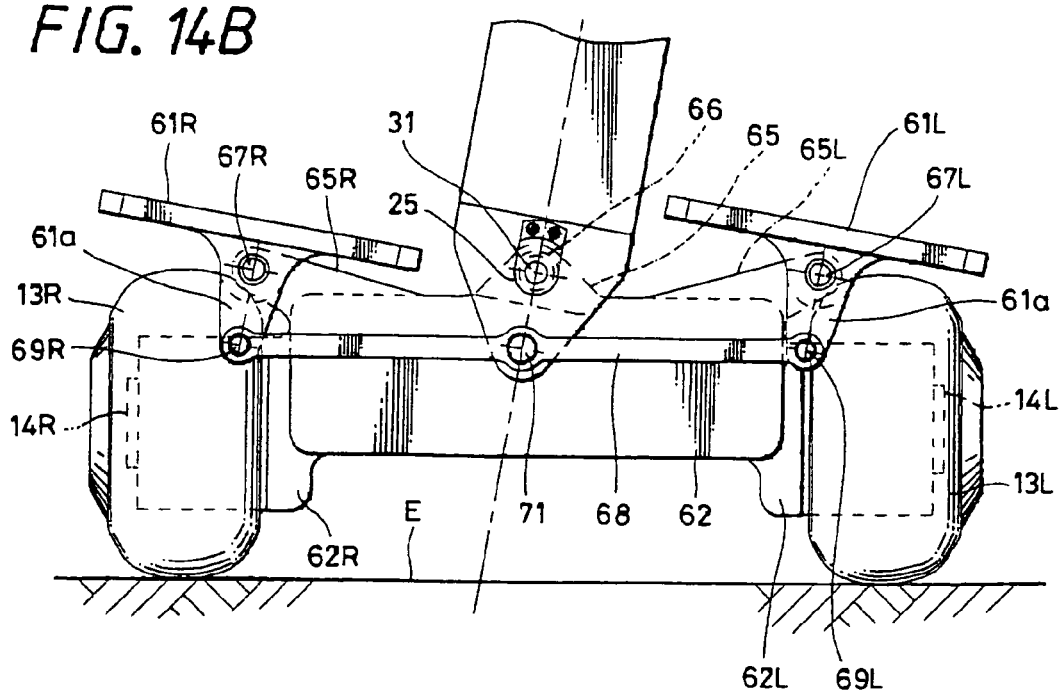
Figures 15A, 15B:
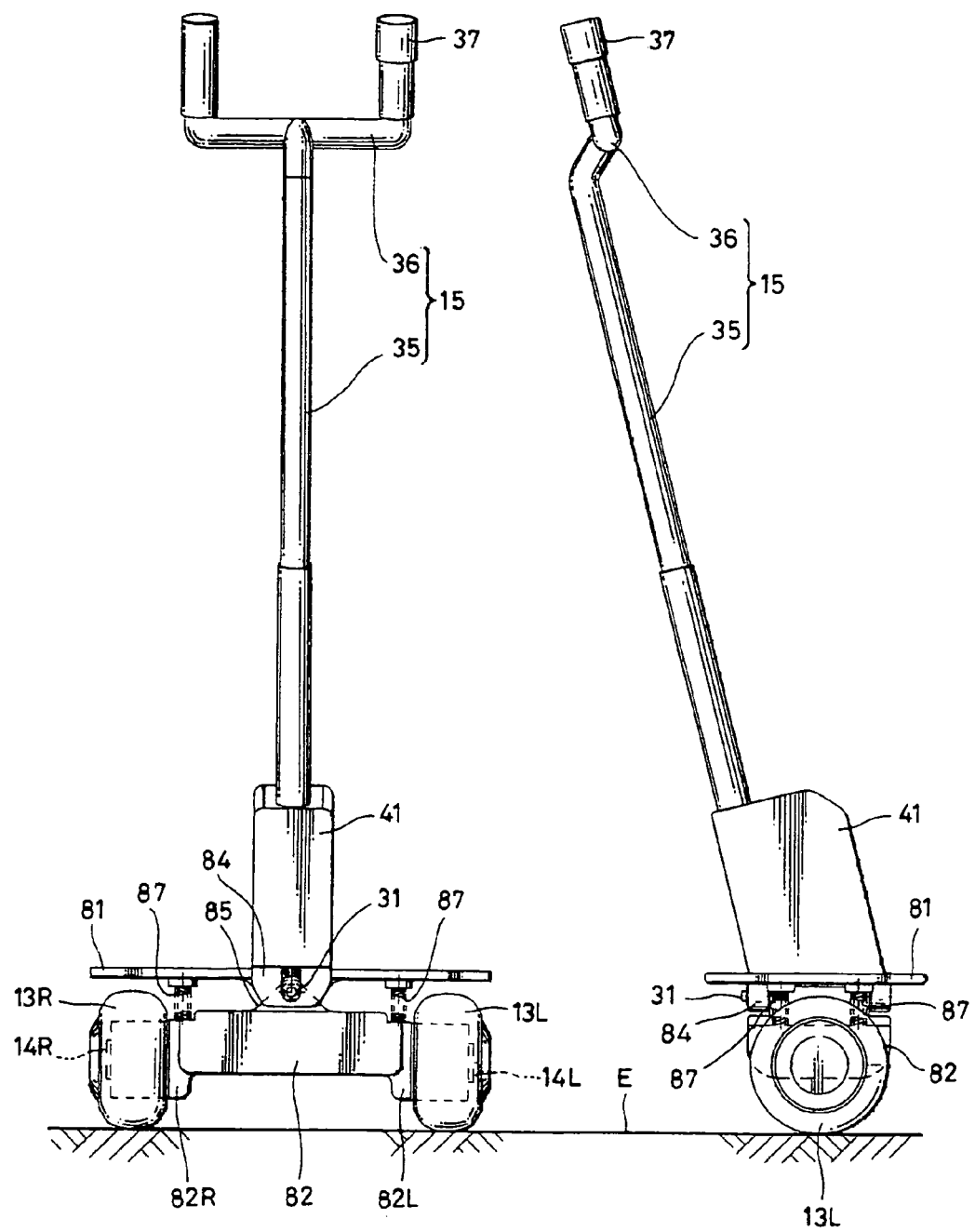
Figure 16A:
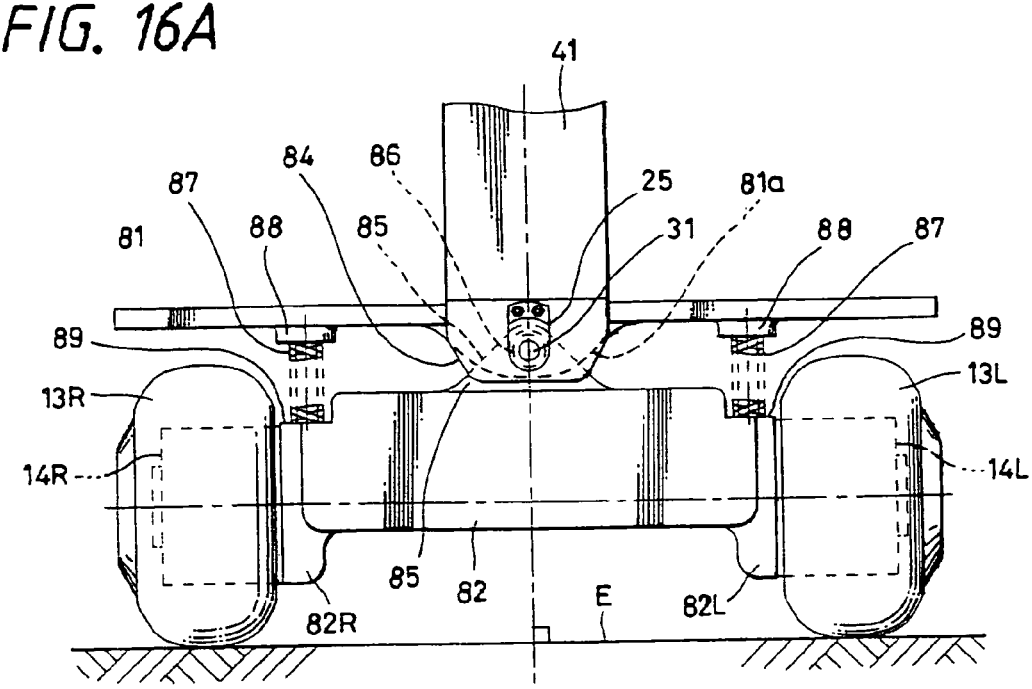
Figure 16B:
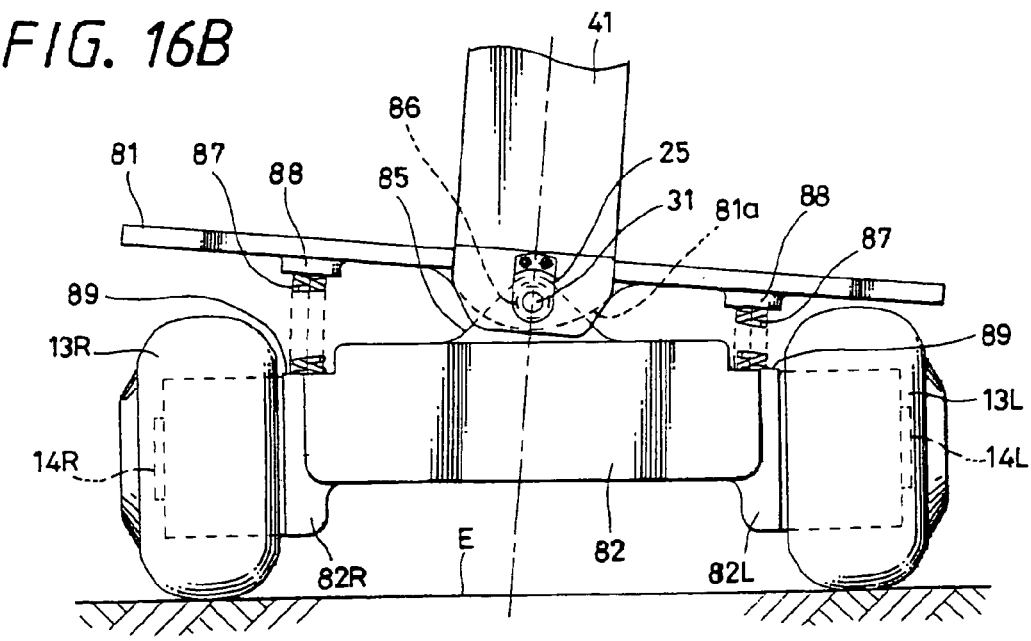

Hereinafter, embodiments of the present invention are explained by referring to the attached drawings. FIGS. 4 through 16 are diagrams to explain embodiments of the present invention. Specifically, FIGS. 4A and 4B are a front view and a lateral view showing a first embodiment of a coaxial two-wheel vehicle according to the present invention; FIG. 5 is an explanatory diagram showing a relevant part of FIG. 4A enlarged; FIG. 6 is an explanatory diagram showing a relevant part of FIG. 4B enlarged; FIG. 7 is a D-D line cross-sectional diagram of FIG. 5; FIG. 8 is a diagram explaining an operation of the coaxial two-wheel vehicle according to the first embodiment; similarly FIGS. 9 and 10 are explanatory diagrams of a relevant part to explain an operation; FIG. 11 is a block diagram for explaining a circuit of a controller of the coaxial two-wheel vehicle according to the first embodiment of the present invention; FIGS. 12A through 12C are explanatory diagrams showing the movement of a rider; FIGS. 13A and 13B are a front view and a lateral view showing a second embodiment of a coaxial two-wheel vehicle according to the present invention; FIGS. 14A and 14B are explanatory diagrams of a relevant part to explain an operation of the coaxial two-wheel vehicle according to the second embodiment of the present invention; FIGS. 15A and 15B are a front view and a lateral view showing a third embodiment of a coaxial two-wheel vehicle according to the present invention; and FIGS. 16A and 16B are explanatory diagrams of a relevant part to explain an operation of the coaxial two-wheel vehicle according to the third embodiment of the present invention.

As shown in FIGS. 4A and 4B, FIG. 5, and FIG. 6, a coaxial two-wheel vehicle 10 that is the first embodiment of the present invention includes two divided steps 11L and 11R showing a specific example of a step plate for a driver to ride, a vehicle body 12 supporting those divided steps 11L and 11R respectively so as to be capable of changing a posture in a roll direction X, a pair of wheels 13L and 13R rotatably supported by the vehicle body 12, a pair of wheel drive units 14L and 14R showing a specific example of wheel drive means which drive and rotate the pair of wheels 13L and 13R, a handle 15 to change a posture of two divided steps 11L and 11R indirectly through the vehicle body 12, and the like.

The two divided steps 11L and 11R are steps for a driver to ride by placing one foot each thereon and are made of a pair of flat boards formed with a size equivalent to or a little larger than a human foot. The vehicle body 12 has a parallel link mechanism in which a vehicle body upper member 16 and a vehicle body lower member 17 are disposed above and below in parallel with each other, and a pair of lateral members 18L and 18R are disposed left and right in parallel with each other and are connected to the vehicle body upper member 16 and the vehicle body lower member 17 in a turnable manner. A pair of coil springs 19L and 19R, showing a specific example of an elastic member that generates spring force to maintain the angle formed by the vehicle body upper member 16 and the vehicle body lower member 17 and the pair of lateral members 18L and 18R to be orthogonal are provided between the vehicle body upper member 16 and the vehicle body lower member 17 of this parallel link mechanism.

Showing as a section in FIG. 7, the vehicle body upper member 16 and the vehicle body lower member 17 are configured to have approximately quadrangular chassis portions 16a and 17a respectively whose lower sides are open, bearing portions 16b and 17b at four positions which are formed to project in the lengthwise direction at four corners of each chassis portion of 16a and 17a, and a pair of spring bearing portions 16c, 16c and 17c, 17c each of which is formed to project to the side of the other member, respectively. Lengths in the left and right direction that is the vehicle width direction of the vehicle body upper member 16 and the vehicle body lower member 17 are set to the same length, and the bearing portions 16b and 17b of four positions provided at the respective corner portions are provided at positions to be mutually overlapped when the both members 16 and 17 are overlapped.

In the vehicle body upper member 16, bearing holes are provided respectively at three positions in the middle and at the both ends in a lengthwise direction that is the left and right direction (six positions in total on both the front and rear sides). Also, in the vehicle body lower member 17, bearing holes are provided respectively at three positions in the middle and at both ends in a lengthwise direction that is the left and right direction (on the rear side two positions at both ends, and so five positions in total). The bearing holes of end portion at the both ends of the vehicle body upper member 16 and those at the both ends of the vehicle body lower member 17 are set at the same intervals so as to correspond to each other, and the pair of lateral members 18L and 18R are provided between the left and right bearing portions 16b, 16b and 17b, 17b that have those bearing holes at the end portions.

The pair of lateral members 18L and 18R is made of members in a flat-plate shape having such a width that they slidably fit between the pair of bearing portions 16b, 16b disposed in the front and rear direction of the vehicle body upper member 16 and the pair of bearing portions 17b, 17b disposed in the front and rear direction of the vehicle body lower member 17, and the pair is disposed on both left and right sides of the vehicle body upper member 16 and the vehicle body lower member 17, with plane portions thereof going upward and downward. Further, bearing holes corresponding to the pair of bearing holes of the vehicle body upper member 16 and corresponding to the pair of bearing holes of the vehicle body lower member 17 are provided at four positions on both sides of each of the lateral members 18L and 18R.

Into four bearing holes positioned in the upper portion among the eight bearing holes of the pair of lateral members 18L and 18R, upper turning support pins 21L and 21R penetrating through the bearing holes of the bearing portions 16b provided at the four positions of the vehicle body upper member 16 are attached by fitting in a turnable manner, respectively. Similarly, into four bearing holes positioned in the lower portion among the eight bearing holes of the pair of lateral members 18L and 18R, lower turning support pins 22L and 22R penetrating through the bearing holes of the bearing portions 17b provided at the four positions of the vehicle body lower member 17 are attached by fitting in a turnable manner respectively. Accordingly, the parallel link mechanism is formed by the vehicle body upper member 16, the vehicle body lower member 17, and the left and right lateral members 18L and 18R.

The wheel drive units 14L and 14R are attached to each outer surface of the pair of lateral members 18L and 18R, respectively. Each of the wheel drive units 14L and 14R may include an electric motor, a reduction gear row connected to a rotary shaft of the electric motor so as to be capable of transmitting power and the like, for example. The wheel drive units 14L and 14R are each configured to have a fixed portion that is fixed to the lateral members 18L, 18R, respectively, and a rotatable portion supported by the fixed portion in a freely rotatable manner, and the pair of wheels 13L and 13R are attached to the rotatable portion, respectively. Thus, the pair of wheels 13L and 13R supported by the pair of lateral members 18L and 18R through the pair of wheel drive units 14L and 14R have the center of rotation corresponding with each other on the same axis center line when being positioned on a flat road surface.

Further, upper end portions of the pair of lateral members 18L and 18R are projected appropriately upward from the upper surface of the vehicle upper member 16, and the above-described divided steps 11L and 11R are individually attached to upper end surfaces thereof. The pair of divided steps 11L and 11R is provided horizontally extending at the same height with a predetermined gap in between in the left and right direction that is a wheel axle direction. The distance between the pair of divided steps 11L and 11R is made to be a distance between both feet when a man is standing in a natural state.

The pair of spring bearing portions 17c, 17c of the vehicle body lower member 17 is provided in the center portion with a predetermined gap in between in the left and right direction. The pair of spring bearing portions 16c, 16c of the vehicle body upper member 16 is provided at positions corresponding to the pair of spring bearing portions 17c, 17c. Further, the coil springs 19L and 19R having appropriate spring force are mounted in an adequately compressed state between the spring bearing portions 16c and 17c corresponding to each other. Here, though not shown in the figure, it is preferable to provide each of the spring bearing portions 16c and 17c with a spring bearing projection to support each end of the coil springs 19L and 19R so that the coil springs 19L and 19R are prevented from dropping off.

Further, as shown in FIG. 7, a handle bracket 24 is attached to the center portion in the left and right direction of the vehicle body upper member 16 and the vehicle body lower member 17. The handle bracket 24 is made of a saddle-shaped member formed to straddle the vehicle body upper member 16 in the front and rear direction, and a front surface portion 24a extending to the lower portion of the vehicle body lower member 17 is provided at the front portion and a rear surface portion 24b extending close to the lower portion of the vehicle body upper member 16 is provided at the rear portion. Further, a fitting portion 24c to fix and support a handle 15 is provided on the upper surface of the handle bracket 24. In the front surface portion 24a of the handle bracket 24, bearing holes are provided respectively at positions corresponding to the front center bearing hole of the vehicle body upper member 16 and the center bearing hole of the vehicle body lower member 17. Further, in the rear surface portion 24b, a bearing hole is provided at a position corresponding to the rear center bearing hole of the vehicle body upper member 16.

An upper-front turning support axle 25 is fit into the upper center bearing hole of the front surface portion 24a of the handle bracket 24 in a turnable manner. Further, an upper-rear turning support axle 26 is fit into the center bearing hole of the rear surface portion 24b in a turnable manner. An axis center line of the upper-front turning support axle 25 and an axis center line of the upper-rear turning support axle 26 are set on the same axis to correspond with each other. An axle top end portion of the upper-front turning support axle 25 is fit into the hole provided in the front surface of the vehicle body upper member 16 and is fastened so as to be fixed with a fixing screw 27 penetrating through the front surface of the vehicle body upper member 16. Similarly, an axle top end portion of the upper-rear turning support axle 26 is fit into the hole provided in the rear surface of the vehicle body upper member 16 and is fastened so as to be fixed with a fixing screw 28 penetrating through the rear surface of the vehicle body upper member 16.

A lower-front turning support axle 29 is fit into the lower-center bearing hole of the front surface portion 24a of the handle bracket 24. The handle bracket 24 is turned in the roll direction X with the lower-front turning support axle 29 as the center of turning. In order to permit the turning of this handle bracket 24 within a predetermined range, to avoid contact with the handle bracket 24, concave cavity portions 16d and 17d are provided in the front surfaces of the vehicle body upper member 16 and the vehicle body lower member 17. Furthermore, an angle detection sensor 31 is attached to the upper-front turning support axle 25 to detect an operation amount (turning amount) of the handle 15 through the turning amount (turning angle) of the handle bracket 24 in the roll direction X.

The angle detection sensor 31 includes an axle portion 31a fixed to the upper-front turning support axle 25 and a detection portion 31b to detect an amount of relative rotational displacement from the axle portion 31a. The detection portion 31b is fixed to one end of a fixing plate 32, and the other end thereof is fixed to the front surface portion 24a of the handle bracket 24 with a fixing screw 33. A potentiometer, a sensor having a variable capacitor structure and the like can be applied as the angle detection sensor 31, for example. In this angle detection sensor 31, an angle of the handle bracket 24 inclined to the vehicle body upper member 16 can be detected by using a change in resistance value that occurs in accordance with the rotational displacement amount generated between the axle portion 31a and the detection portion 31b.

The lower end portion of the handle 15 is fixed to the fitting portion 24c of the handle bracket 24. The handle 15 is configured to have a handle post 35 fit and fixed to the fitting portion 24c and a handle lever 36 provided at the upper end portion of the handle post 35. The handle post 35 is attached to the vehicle body 12 in a state of being slightly inclined forward, and the top end side is extended upward. The handle lever 36 is formed in a U-shape, and with projection portions at both ends thereof facing upward, the upper end portion of the handle lever 36 is connected to a middle portion so as to be integrally formed.

Further, a turning operation ring 37 that can control the drive of the pair of wheel drive units 14L and 14R is attached to the upper end portion of one of the projection portions of the handle lever 36. The turning operation ring 37 is to control a turning motion of the vehicle by manual operation and to form an accelerator ring for the turning motion. When the turning operation ring 37 is turned in a desired direction in which a driver intends to make a turn, a signal corresponding to the operation amount is output to a controller described later on, the controller controls the drive of the pair of wheel drive units 14L and 14R accordingly, and a rotational difference is generated between the left and right wheels 13L and 13R, and so a turning can be performed at a desired speed.

As shown in FIG. 7, a power source storage portion 39 accommodating a battery 38 that is a specific example of a power source to supply electric power to the pair of wheel drive units 14L and 14R, the controller, the other electronic devices and electric apparatuses and the like is provided on the upper surface of the handle bracket 24 that is a base portion of the handle 15. The power source storage portion 39 has a cartridge structure in this embodiment, which accommodates a large number of batteries 38. However, the power source is not limited to the battery 38 shown in this embodiment, but needless to say a portable storage cell, a fuel cell, and other power sources can be used as well. The power source storage portion 39 is covered with a power source cover 41 so that rain, dust, and the like are prevented from entering.

Drive circuits 44L and 44R to drive the pair of wheel drive units 14L and 14R and the like are incorporated in the chassis portion 16a of the vehicle body upper member 16. Further, a posture sensor unit 45 that detects the posture of the vehicle body 12, the posture of the handle 15 and the like and outputs detection signals thereof and a controller 46 to output a control signal for driving and controlling the pair of wheel drive units 14L and 14R and the like are provided in the vehicle body lower member 17. The controller 46 executes predetermined arithmetic processing based on the detection signal from the posture sensor unit 45, the detection signal from the angle detection sensor 31 and the like, and a necessary control signal is output to the pair of wheel drive units 14L and 14R and the like.

As shown in FIG. 11, the controller 46 is configured to have an arithmetic circuit 47 including a microcomputer (CPU), a storage device 48 including a program memory, a data memory, other memories, such as RAM and ROM, and the like, for example. The battery 38 and the pair of wheel drive circuits 44L and 44R are connected to the controller 46, and they are also connected through an emergency stop switch 49. The pair of drive circuits 44L and 44R individually control rotational speed, rotational direction, and the like of the pair of wheels 13L and 13R, and the pair of wheel drive units 14L and 14R are individually connected thereto.

A detection signal from the angle detection sensor 31 to detect an inclination angle of the handle 15, a signal corresponding to a turning operation amount from the turning operation ring 37, and a detection signal from the posture sensor unit 45 are supplied to the controller 46. The posture sensor unit 45 is used to detect angular speed and acceleration and to control the angular speed and travel acceleration when the coaxial two-wheel vehicle 10 is traveling, and it includes a gyroscopic sensor and an acceleration sensor, for example.

The gyroscopic sensor detects angular speed relating to at least any one of a pitch axis (corresponding to axle of the pair of wheels 13L and 13R) 51, a roll axis (passing through the center of the vehicle body 12 and being parallel with a travel direction of the vehicle) 52, and a yaw axis (passing through the center of the vehicle body 12 and being vertical to a road surface for the vehicle to travel) of the vehicle body 12. Further, the acceleration sensor of the posture sensor unit 45 detects acceleration related to at least any one of three axes (X-axis, Y-axis, and Z-axis) when the vehicle body 12 is expressed by the three axes.

The coaxial two-wheel vehicle 10 having the above-described configuration can travel in the following manner, for example. FIGS. 4A and 4B show a state of the vehicle when traveling straight on a flat road surface E, and in this state, an axis center line CL being the center of handle 15 becomes vertical to the traveling road surface E when viewed from the front. In addition, the left and right divided steps 11L and 11R are maintained horizontally at the same height.

FIG. 8 shows a state in which one wheel (left wheel 13L in this embodiment) of the vehicle that travels straight on the flat road surface E runs onto a step K. In this case, with the handle 15 being kept vertical by a rider, the vehicle can travel in a state in which the left and right divided steps 11L and 11R are maintained horizontally. Accordingly, even if the center of gravity of the rider driving in a standing posture is at a high position, the step K of the road surface E can be absorbed by the change in the height direction of the left and right divided steps 11L and 11R, and so the rider can drive and travel stably without the upper body being swayed left and right.

FIG. 9 shows a state of turning on the flat road surface E. In this case, the rider inclines the handle 15 and his/her upper body toward the turning center side (inside) to make the left and right divided steps 11L and 11R and the left and right wheels 13L and 13R inclined in parallel with the handle 15, and the whole vehicle including the rider can be brought to a state of easily counteracting the centrifugal force.

Further, FIG. 10 shows a state of traveling on an inclined road surface (cant road surface M) in the direction orthogonal to the inclining direction. In this case, similarly to a change in the state of the road surface in the roll axis direction (that is the left and right direction with respect to the traveling direction) when running onto the step K, the rider keeps the handle 15 vertical and can travel in a state of the left and right divided steps 11L and 11R being maintained horizontally. Accordingly, even if the center of gravity of the rider driving in a standing posture is at a high position, the cant road surface M can be absorbed by the change in the height direction of the left and right divided steps 11L and 11R, and so the rider can drive and travel stably without the upper body being swayed left and right.

Next, a method of turning the coaxial two-wheel vehicle 10 is explained. FIG. 12A shows a state of the coaxial two-wheel vehicle 10 traveling straight on the flat road surface E. FIG. 12B shows a state of turning to the left on the flat road surface E. Further, FIG. 12C shows a state of traveling straight on the cant road surface M (including the case of running onto the step K).

When turning the coaxial two-wheel vehicle 10, basically the following two methods can be listed: a method of determining a turning amount (turning speed, turning radius and the like) only by inclination of the handle 15; and a method of determining a turning amount by the rider rotating the turning operation ring 37 (accelerating turning speed) in addition to the inclination of the handle 15.

First, an explanation of the method of determining the turning amount only by the inclination of the handle 15 to make a turn is given. As shown in FIG. 9, a turning operation amount in this case is determined by a handle virtually-inclined angle θh between the handle 15 and a gravity axis V. Based on the turning operation amount and vehicle speed, a rotational difference is given to the left and right wheels 13L and 13R, so that a turning radius which generates a predetermined centrifugal force is obtained to make a turn. In this case, the handle virtually-inclined angle θh can be detected as follows.

The first example is the above-described posture sensor unit 45 is attached to the handle 15 or is attached to one of the pair of divided steps 11L and 11R inclining in parallel with the handle 15 so that the inclination of the handle 15 is directly detected.

The second example is the posture sensor unit 45 is attached to the vehicle body lower member 17 as shown in FIG. 7. In this case, a position sensor is provided in order to detect a relative angle between the handle 15 and the vehicle body lower member 17 or between the handle 15 and the vehicle body upper member 16. In the embodiment shown in FIG. 7, the angle detection sensor 31 provided in the vehicle body upper member 16 corresponds to the position sensor, and a potentiometer and the like can be applied as the angle detection sensor 31, for example. Output of the angle detection sensor 31 and output of the posture sensor unit 45 are used to calculate the difference between a "vehicle inclination angle θg formed with the gravity axis V" that is the output of the posture sensor unit 45 inside the vehicle body 12 with the gravity axis V as a reference and a "handle relatively-inclined angle θp of the handle 15 against the vehicle body" that is the output of the angle detection sensor 31, and the handle virtually-inclined angle θh (θp−θg=θh) of the handle 15 is detected.

For example, when the handle relatively-inclined angle θp that is the output of the angle detection sensor 31 coincides with the vehicle inclination angle θg that is the output of the posture sensor unit 45, the handle 15 is vertical and the vehicle is in the state of traveling straight regardless of the road surface status (flat road surface, cant road surface M, step K, and the like), as shown in FIG. 12A as well as FIG. 10 and FIG. 12C. On the other hand, when the coaxial two-wheel vehicle 10 is making a turn as shown in FIG. 9, a value obtained by subtracting the vehicle inclination angle θg that is the output of the posture sensor unit 45 from the handle relatively-inclined angle θp that is the output of the angle detection sensor 31 becomes the handle virtually-inclined angle θh formed with the gravity axis V, and the turning operation amount is determined based on this handle virtually-inclined angle θh.

Next, an explanation of the method of determining the turning amount by the rider rotating the turning operation ring 37 in addition to the inclination of the handle 15 is given. In the case of almost no centrifugal force being generated (for example, the centrifugal force is 0.1 G or less) such as making a low-speed turn, making a super-pivotal brake turn and the like, the rider can select an operation according to the travel speed by using both the inclination of the handle 15 and the turning operation ring, because in such cases operability is improved by manually rotating the turning operation ring 37 provided at the top of the handle lever 36 rather than by inclining the handle. In this case, based on the turning operation of the turning operation ring 37, the above-described method of determining the turning amount and making a turn only by the inclination of the handle 15 is added to the operation amount, and so the turning operation amount at the time of turning is controlled in the state of both being combined and used.

First, when the turning operation ring 37 of the handle lever 36 is manually turned, the operation amount of the turning operation ring 37 is detected by the position detection sensor made of the potentiometer or the like, and a detected signal is supplied to the controller 46. Then, the controller 46 outputs a control signal to the left and right wheel drive units 14L and 14R so that a turn radius generating a predetermined centrifugal force (for example, 0.2 G) according to vehicle speed is obtained, and gives a predetermined rotational difference to the left and right wheels 13L and 13R.

Here, when it is intended further to make a sharp turn, the rider inclines the handle 15 toward the center of turn. Then, the amount of the handle 15 inclined is detected by the angle detection sensor 31 as described above and a posture of the vehicle is detected by the posture sensor units 45, and so a wheel control amount corresponding to the amount of the handle inclined is calculated. The wheel control amount by the inclination of the handle 15 is added to the wheel control amount by the turning operation of the turning operation ring 37. As a result, the controller 46 outputs a control signal to the left and right wheel drive units 14L and 14R so that the rotational difference of the left and right wheels 13L and 13R is changed to obtain a turn radius generating a predetermined centrifugal force (for example, 0.4 G). Accordingly, making a turn can be performed stably without the upper body of the rider in the standing posture being swayed left and right, even if the turning speed is fast.

In the first embodiment, the step plate is divided in two to be disposed left and right, because the following advantages are obtained when such divided two steps 11L and 11R are used. When running onto a step, for example, one of the wheels first runs onto the step K as shown in FIG. 8, but the wheel on that side can be run onto the step K with less drive power, with the rider shifting the center of gravity to the side of the lower wheel (on the side not running thereon) at this time. Subsequently, the center of gravity is shifted to the side of the wheel running thereon, then the wheel on the lower side (on the side not running thereon) runs onto the step, which makes the rider feel just like going up the step K on foot, and therefore the vehicle can run over the step K with less drive power.

FIGS. 13A and 13B and FIGS. 14A and 14B are diagrams showing a second embodiment of a coaxial two-wheel vehicle according to the present invention. A coaxial two-wheel vehicle shown as the second embodiment includes: a vehicle body 62 formed with one chassis, two divided steps 61L and 61R individually supported by the vehicle body 62 in a freely turnable manner, and a connecting link 68 connecting the two divided steps 61L, 61R and a handle bracket 64 in a turnable manner. In this second embodiment, the same reference numerals are given to portions corresponding to those in the above-described first embodiment, and a duplicated explanation thereof is omitted.

As shown in FIGS. 13A and 13B and FIGS. 14A and 14B, the vehicle body 62 is constructed as one chassis, and left and right wheel drive units 14L and 14R are respectively attached to mounting portions 62L and 62R provided on both sides in the left and right direction that is the width direction of the vehicle body. Further, the left and right wheels 13L and 13R are respectively supported by the wheel drive units 14L and 14R in a freely rotatable manner. Further, a handle support portion 65 is provided in the center of an upper portion of the vehicle body 62, and step support portions 65L and 65R are provided on both sides of the upper portion. Bearing holes are respectively provided in the handle support portion 65 in the center and in the step support portions 65L and 65R on both sides, penetrating through the front and rear direction that is the direction for the vehicle to travel.

The three bearing holes provided in the handle support portion 65 and in the step support portions 65L and 65R of the vehicle body 62 are set at the same height, the handle bracket 64 is supported by the handle support portion 65 in a turnable manner by means of a turning support axle 66, and the left and right divided steps 61L and 61R are supported by the step support portions 65L and 65R in a turnable manner by means of upper turning support pins 67L and 67R. Each of the divided steps 61L and 61R is provided with an arm portion 61*a* projecting in the direction vertical to the step surface on which a foot is put. In each arm portion 61*a*, bearing holes are provided in a base portion and a top end portion thereof respectively, and the above-described upper turning support pins 67L and 67R are fit into the bearing holes of the base portions in a freely turnable manner.

In addition, both end portions of the connecting link 68 connecting the arm portions 61*a* of the divided steps 61L and 61R on the left and right are connected to the bearing holes at the top end portions of respective arm portions 61*a* in a freely turnable manner by means of lower turning support pins 69L and 69R. Further, the handle bracket 64 is connected to a middle portion in the axis direction of the connecting link 68 in a freely turnable manner by means of a turning connection pin 71. Therefore, two bearing holes having the same interval as the two bearing holes provided in each of the arm portions 61a are provided in the handle bracket 64. Hence, the handle bracket 64, the left and right divided steps 61L and 61R, and the connecting link 68 constitute a parallel link mechanism. The other configuration than the above is similar to the above-described first embodiment.

Thus, when the rider inclines the handle 15 or the divided steps 61L and 61R, the left and right divided steps 61L and 61R or the handle 15 synchronously tilts in the same direction. FIG. 14A is a diagram showing an initial state in which the handle 15 is in an upright position. FIG. 14B is a diagram showing a state in which the handle 15 and the left and right divided steps 61L and 61R are inclined. At this time, the upper surface of the left and right divided steps 61L and 61R is in a state of being inclined toward the road surface E by the amount of inclination of the handle 15. An effectiveness similar to that of the above-described first embodiment can also be obtained with the configuration of the coaxial two-wheel vehicle 60 described above.

FIGS. 15A and 15B and FIGS. 16A and 16B are diagrams showing a third embodiment of a coaxial two-wheel vehicle according to the present invention. A coaxial two-wheel vehicle shown as the third embodiment includes: a vehicle body 82 formed with one chassis, one step plate 81 supported by the vehicle body 82 in a manner of making a posture freely changeable, and the handle 15 integrally fixed to the step plate 81. In this third embodiment, the same reference numerals are given to portions corresponding to those in the above-described first embodiment, and a duplicated explanation thereof is omitted.

As shown in FIGS. 15A and 15B and FIGS. 16A and 16B, the vehicle body 82 is constructed as one chassis, left and right vehicle drive units 14L and 14R are respectively attached to mounting portions 82L and 82R provided on both sides in the left and right direction that is a width direction of the vehicle body, and the left and right wheels 13L and 13R are respectively supported by the wheel drive units 14L and 14R in a freely rotatable manner. A step support portion 85 is provided in the center of an upper portion of the vehicle body 82. In this step support portion 85, a bearing hole is provided to penetrate in the front and rear direction that is the direction for the vehicle to travel.

The step plate 81 is constructed as one plate having the size to cover approximately the whole range from the vehicle body 82 to the left and right wheels 13L and 13R. A bracket portion 84 is integrally provided approximately in the center portion in the left and right direction on the lower surface of the step plate 81. The bracket portion 84 is made of two convex portions at a predetermined interval in the front and rear direction, and the step support portion 85 of the vehicle body 82 is fit between those convex portions. The bracket portion 84 and a step support portion 85 are supported from the front and rear in a freely turnable manner by means of two turning support axles 86 disposed on the same axis center line.

Furthermore, four coil springs 87 showing a specific example of an elastic member to maintain the step plate 81 horizontally to the vehicle body 82 are interposed between the step plate 81 and the vehicle body 82. The four coil springs 87 are disposed at predetermined intervals to be symmetrical in the front and rear direction and in the left and right direction, respectively. For this purpose, four spring support portions 88 to support the upper end of the coil springs 87 are provided at four positions on the lower surface of the step plate 81, and four spring support portions 89 to support the lower end of the coil springs 87 are provided at four positions on the upper surface of the vehicle body 82.

Thus, when the rider inclines one of the handle 15 and the step plate 81, the other being integrally formed is inclined integrally in the same direction. FIG. 16A is a diagram showing an initial state in which the handle 15 is in an upright position. Further, FIG. 16B is a diagram showing a state in which the handle 15 and the step plate 81 are inclined. At this time, the upper surface of the step plate 81 is in a state of being inclined toward the road surface E by the amount of inclination of the handle 15. An effectiveness similar to the above-described first and second embodiments can also be obtained with the configuration of the coaxial two-wheel vehicle 80 as described above. Note that, needless to say, the elastic member is not limited to the coil spring 87 shown in this embodiment and a board spring, a rubber-like elastic body or the like, for example, can be used as well.

As heretofore explained, according to the embodiments of the present invention, since turning is performed by inclining the step plate and the handle in the roll axis direction inside the turn, a rider can stably drive the vehicle and travel against the centrifugal force even in a state of the center of gravity being positioned high, such as in a standing posture. In this case, by attaching the axle and the wheel to the step plate portion, a camber angle is also generated inside the turn regarding the wheel, and so lateral force applied to a tire can be reduced and a stable tire grip can be obtained.

Further, in the case of the first embodiment of the present invention, the pair of divided steps remain horizontal without inclining to the left and right, when the road surface changes in the roll axis direction (left and right direction orthogonal to the traveling direction of the vehicle), such as when traveling on a cant road surface and one wheel running onto a step, and therefore such road surface change can be absorbed by the change in the height direction based on the upward and downward fluctuation of the pair of divided steps, and a rider can stably drive the vehicle and travel without causing the upper body to be swayed left and right even in a riding state of the center of gravity being positioned high, such as in a standing posture. Moreover, when running onto a step in the oblique direction, similarly to ascending stairs on foot, the rider can climb up the step with less drive power by shifting the center of gravity put over left and right feet.

Furthermore, according to the embodiments of the present invention, a coaxial two-wheel vehicle can be made having the size of a projected floor area of an average person (about 400 mm or less in width and about 250 mm or less in length). Therefore, since the vehicle has the width equivalent to a space for a person walking, traveling can be performed smoothly without being an obstacle to other people walking even in a crowded area, such as on a sidewalk.

The present invention is not limited to the above-described embodiments in which a grip portion of the handle is, for example, formed into an U-shape, but the grip portion may also be a straight line shape, an oval shape or a circular shape, and needless to say other handle shapes can be applied as well. Thus, various modifications can be implemented without deviating from the scope and spirit of the present invention.

It should be understood by those skilled in the art that various modifications, combinations, sub-combinations and alterations may occur depending on design requirements and other factors insofar as they are within the scope of the appended claims or the equivalents thereof.

The invention claimed is:

1. A coaxial two-wheel vehicle comprising:
   a step plate for a driver to ride;
   a vehicle body that rotates around a roll axis as the center with a traveling direction being the roll axis, the vehicle body supports said step plate so as to be capable of changing a posture of the step plate in a roll direction when the vehicle body rotates around the roll axis, the roll direction being formed substantially in a plane orthogonal to the traveling direction;
   a pair of wheels, with one wheel disposed on each side of the vehicle on the same axis in the direction orthogonal to said traveling direction of said vehicle body and rotatably supported by the vehicle body;
   a pair of wheel drive means to drive and rotate said pair of wheels independently; and
   a handle for directly changing a posture of said step plate in the roll direction or indirectly changing the posture in the roll direction through said vehicle body when the handle is moved to indicate a desired travel direction.

2. The coaxial two-wheel vehicle according to claim 1,
   wherein said vehicle body includes a parallel link mechanism having a vehicle body upper member and a vehicle body lower member that are disposed above and below in parallel with each other and a pair of lateral members that are disposed left and right in parallel with each other and that are connected to said vehicle body upper member and vehicle body lower member in a turnable manner, and
   said step plate is divided in two to provide two divided steps, which are individually fixed to said pair of lateral members, and said pair of wheels are supported by the pair of lateral members through said pair of wheel drive means.

3. The coaxial two-wheel vehicle according to claim 1,
   wherein said step plate is divided in two to provide two divided steps, which are individually supported by said vehicle body in a turnable manner, and the two divided steps are connected by a connecting link to be turnable and to the middle portion of which said handle is connected in a turnable manner to make said two divided steps turnable in synchronization with an operation of the handle.

4. The coaxial two-wheel vehicle according to claim 1, wherein said handle is fixed to said step plate and a posture of said step plate is capable of being changed by an operation of the handle.

5. The coaxial two-wheel vehicle according to claim 1, further comprising:
   posture detecting means to detect an angle between said step plate or said handle and a gravitational axis and to output the detection signal,
   wherein based on the detection signal from the posture detecting means the drive of said pair of wheel drive means is controlled such that predetermined centrifugal force is given.

6. The coaxial two-wheel vehicle according to claim 1,
   wherein a posture of said step plate is changed to cancel the centrifugal force given to said driver based on a control signal output to said pair of wheel drive means.

7. The coaxial two-wheel vehicle according to claim 2,
   wherein an elastic member, which generates spring force to maintain angles respectively formed by said vehicle body upper member and vehicle body lower member and said pair of lateral members to be orthogonal, is interposed between the vehicle body upper member and vehicle body lower member.

8. The coaxial two-wheel vehicle according to claim 4,
   wherein an elastic member which generates spring force to maintain said step plate in parallel with the vehicle body is interposed between said step plate and said vehicle body.

9. A coaxial two-wheel vehicle comprising:
   a first and a second step plate spaced apart from each other and provided for a driver to stand on while riding the vehicle,
   a vehicle body that rotates about a roll axis, a longitudinal direction of the roll axis extending along a traveling direction, the vehicle body supports the first and second step plates such that the step plates rotate along a plane orthogonal to the traveling direction when the vehicle body rotates around the roll axis;
   a pair of wheels, with one wheel disposed on each side of the vehicle body along a same axis in the direction orthogonal to the traveling direction and rotatably supported by the vehicle body;
   a pair of wheel drive means to drive and rotate said pair of wheels independently; and
   a handle for changing a position of the step plates in the plane orthogonal to the traveling direction when the handle is moved to indicate a desired travel direction.

10. The coaxial two-wheel vehicle according to claim 9, wherein each of the step plates are individually supported by the vehicle body in a turnable manner about an axis substantially parallel to the roll axis.

11. The coaxial two-wheel vehicle according to claim 9, wherein the step plates are connected by a connecting link such that a plane formed by a top surface of a first one of the step plates is substantially parallel to a plane formed by a top surface of a second one of the step plates, and wherein the planes remain substantially parallel to each other during rotation of the vehicle body about the roll axis.

12. The coaxial two-wheel vehicle according to claim 10, wherein the step plates are connected by a connecting link such that the step plates are turnable in synchronization based on an operation of the handle.

13. The coaxial two-wheel vehicle according to claim 10, wherein the handle includes a rotatable turning operation device that controls a turning motion of the vehicle.

14. The coaxial two-wheel vehicle according to claim 10, wherein the vehicle body includes a parallel link mechanism having a vehicle body upper member and a vehicle body lower member that are disposed above and below in parallel with each other and a pair of lateral members that are disposed left and right in parallel with each other and that are connected to said vehicle body upper member and vehicle body lower member in a turnable manner, wherein the step plates are connected to the parallel link mechanism so as to be turnable in synchronization.

* * * * *